US007095861B2

(12) United States Patent
Byers

(10) Patent No.: US 7,095,861 B2
(45) Date of Patent: Aug. 22, 2006

(54) AUDIBLE SIGNALING DEVICE WITH DETERMINATE DIRECTIONAL RADIATION

(75) Inventor: Charles Calvin Byers, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 645 days.

(21) Appl. No.: 10/081,352

(22) Filed: Feb. 22, 2002

(65) Prior Publication Data

US 2003/0161483 A1 Aug. 28, 2003

(51) Int. Cl.
*H04B 1/00* (2006.01)

(52) U.S. Cl. ........................................ 381/86; 340/436

(58) Field of Classification Search .................. 381/86; 340/901–904, 436; 246/124, 122 R, 292–295
See application file for complete search history.

(56) References Cited

U.S. PATENT DOCUMENTS 5,012,211 A * 4/1991 Young et al. ............... 333/212
5,233,664 A * 8/1993 Yanagawa et al. ............ 381/89
5,890,682 A * 4/1999 Welk .......................... 246/125
6,457,682 B1 * 10/2002 Anderson et al. ........... 246/292
2003/0185404 A1 * 10/2003 Milsap ........................ 381/77

* cited by examiner

*Primary Examiner*—Brian T. Pendleton
(74) *Attorney, Agent, or Firm*—Michael Johannesen; Steven R. Santema

(57) ABSTRACT

An audible signaling device uses one or more digital signal processors to modify the shape of a sound field to put high sound pressure levels only in a predetermined pattern, thus minimizing undesirable high volume levels in adjacent areas. Using digital signal processing techniques, and a plurality of high power amplifiers and loudspeakers mounted in an array on a moving vehicle, a carefully engineered sound field can be produced. The shape of this sound field is controlled by the frequencies amplitudes, and phases of the signals, as well as the characteristics and placements of the speakers in the array.

2 Claims, 3 Drawing Sheets

AUDIBLE SIGNALING DEVICE WITH DETERMINATE DIRECTIONAL RADIATION

FIELD OF THE INVENTION

This invention relates to the field of audible signaling devices, such as train whistles or horns, sirens and the like, and, more specifically, to an audible signaling device that produces a directional signal that only projects sound in a pattern determined to alert only those in a preselected zone.

BACKGROUND OF THE INVENTION

In today's society, there are many conflicting social goals that can rarely be reconciled. Specifically, safety and noise pollution frequently come into conflict. Emergency vehicle sirens and train whistles are examples of such diverse goals. While it is clearly necessary that pedestrians and drivers are audibly alerted to the approach of one of these vehicles, these sirens and whistles have had to become louder to be heard over the background noise of traffic; and thus these devices also are clearly heard by others who need not be aware of the presence of the vehicle. For purposes of describing this invention, trains and train crossings will be used as an example, however, the invention is much broader than this area, as will be apparent to one skilled in the art after reading this specification.

As a train approaches a grade crossing (railroad tracks intersecting a road at the same level), the engineer is required by law to give four whistle blasts to alert motorists on the road of its approach. Whistle is used herein to mean horn or other warning device. People living and working near the grade crossing are often disturbed by the loudness of these blasts, especially at night. New, tougher safety rules mandate minimum loudness levels that must be used even at night, causing political backlash from citizens living near the tracks. The sound energy generated by the standard air horns disperses in a roughly hemispherical pattern, so much of the energy is wasted on regions that are nowhere near the grade crossing area that the alert is intended for.

SUMMARY OF THE INVENTION

This invention uses digital signal processing techniques to modify the shape of the sound field to only put high sound pressure levels in a predetermined pattern, minimizing undesirable high volume levels in adjacent areas. Using digital signal processing techniques, and a plurality of high power amplifiers and loudspeakers mounted in an array on a moving vehicle, a carefully engineered sound field can be produced. The shape of this sound field is controlled by the frequencies amplitudes, and phases of the signals, as well as the characteristics and placements of the speakers in the array.

A train whistle is disclosed herein as an exemplary embodiment of this invention. As the train approaches a grade crossing, a sign alongside the track (known in the art as a "whistle post") instructs the engineer to start signaling a grade crossing alert using the whistle, according to the prior art. This invention employs a proximity detector or, in another preferred embodiment, a differential GPS receiver, to determine when to start the signal. The signals needed to project a "T" shaped sound field at the exact position of the intersection are calculated by a DSP, passed through a rank of D/A converters and amplifiers and projected through an array of loudspeakers attached to the outside of the locomotive of the train. As the train moves forward, motion sensors on the wheels determine the locomotive's advancing position, and the DSP continuously recalculates the signals to keep the maximum sound pressure levels on the intersection. As the locomotive enters the intersection, the sound is momentarily projected perpendicularly to the tracks, and then is cut off.

BRIEF DESCRIPTION OF THE DRAWINGS

A more complete understanding of this invention may be obtained from a consideration of the specification taken in conjunction with the drawings, in which.

DETAILED DESCRIPTION

Figure 1:
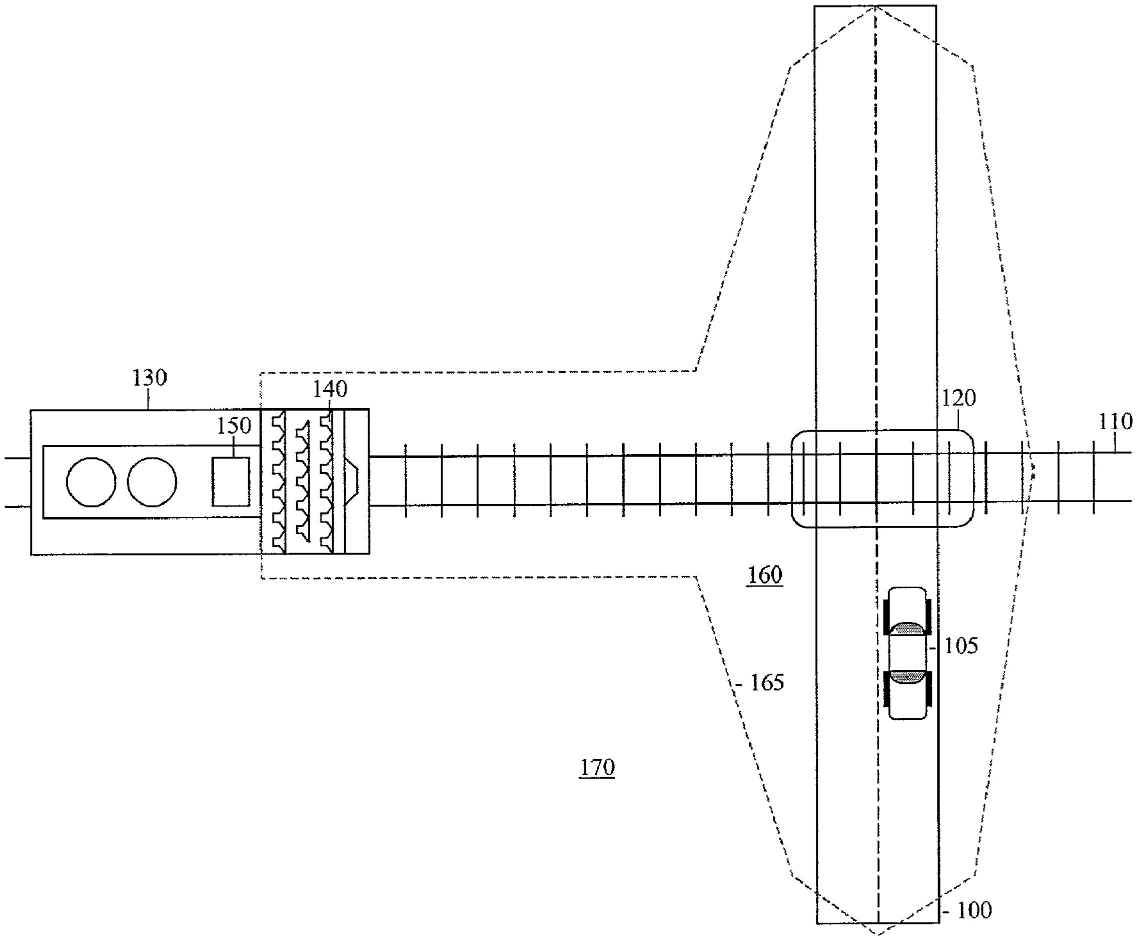
FIG. 1 depicts a railroad locomotive approaching a grade crossing.

Turning to FIG. 1, an overhead view of a train approaching a grade crossing is depicted. Roadway 100 intersects railroad track 110 at grade crossing intersection zone 120. Vehicular traffic 105 and pedestrian traffic (not shown) must be alerted of the approach of a train, represented by locomotive 130. Federal regulations specify that locomotive 130 audibly signal as it approaches the grade crossing with a minimum sound pressure level at defined distances from the crossing. These signals are to provide adequate stopping time for vehicle 105.

According to one exemplary embodiment of this invention, locomotive 130 includes an array of acoustic transducers 140 arranged in a predetermined pattern over its exterior. Transducers 140 may be horn-type loudspeakers or other devices capable of reproducing well-controlled sounds of high volume levels. Electronics assembly 150 includes sensors to determine the train's position and velocity, computational elements to calculate the sound waveforms for each of the transducers in the array, and power amplifiers to drive the transducers, as will be described below in more detail in connection with FIG. 2.

In operation, each transducer in the array 140 is driven with a different signal, with specific frequency spectrum, amplitude, and phase. These signals are carefully calculated such that the plurality of high sound pressure level signals emanating from all the transducers in the array will add and interfere in desirable ways. This interference is constructive in the region in front of the locomotive and on the roadway, 160, producing high amplitude sound, and destructive in regions away from the roadway, 170, greatly reducing undesirable noise. "Constructive" and "destructive" are well known in the art of acoustics and are used in its technical definition. Contour line 165 shows the boundary where the sound level is 3 dB below (or half power) the maximum amplitude in intersection region 120.

Figure 2:
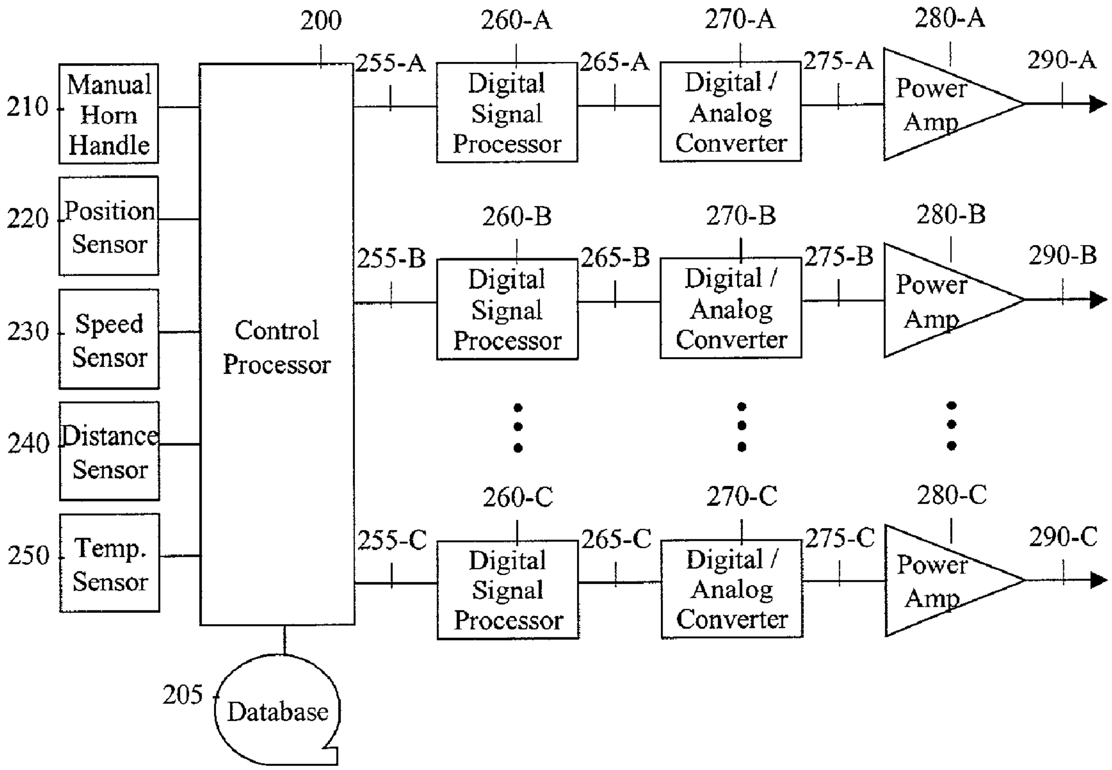
FIG. 2 is a block diagram of the equipment needed to implement the invention.

FIG. 2 presents a block diagram of the elements in the electronics assembly 150. Control processor 200 is responsible for determining when to activate the whistle and how to shape the sound field. It receives input from a variety of controls and sensor inputs. Its output is a series of coefficients used to control the sound generation elements. By controlling these coefficients in real time as the train advances, the shape of the sound field is adjusted dynamically.

Several inputs to processor 200 are necessary. Some of these signals are digital, in the form of simple contact closures or serial bit streams, while others are analog. Processor 200 includes appropriate input signal conditioning, including A/D converters as necessary for analog signals to make the necessary parameters available to the control algorithm. Manual horn handle 210 is located in the engineer's cab, and is used to activate the system on demand. Position sensor 220 determines the locomotive's position, which must be known in order to calculate the distance to the crossing and set the coefficients appropriately. Position sensor 220 could be a differential Global Positioning System receiver, as known in the art, or a proximity sensor that detects markers placed along the track to designate where the whistling should begin. Speed transducer 230 measures the velocity of the locomotive, and distance sensor 240 determines how far the locomotive advances as it approaches the crossing using wheel rotation sensors, as known in the art. Thermometer 250 measures the outside air temperature, because the accuracy of the sound field calculation depends upon the speed of sound, which further depends upon air temperature.

The control processor 200 also requires a database 205 to supply some of the parameters needed to calculate the coefficients. This database may include information about the latitude and longitude of all grade crossings on a railroad line. These positions are compared with the output of position sensor 220 to determine when to activate the system, and the distance to the intersection. Database 205 also contains digitized or algorithmically generated waveforms to determine the sound character of the whistle. In this exemplary embodiment, the sound is stored in pulse code modulated (PCM) digitized form, as is known in the art. Finally, database 205 must include the geometric position of each transducer in the array, in order to facilitate the calculation of the coefficients.

The state of the inputs 210, 220, 230, 240, 250 and the contents of the database 205 are processed to calculate coefficients needed to control the multiple channels of sound generation. These coefficients are transmitted over links 255A–C to a plurality of Digital Signal Processors, represented by DSP's 260A–C.

DSP's 260A–C accept the coefficients and calculate the waveform necessary for each transducer in the array in order to produce the desired sound field shape. These calculations involve determining the distance from each of the transducers to the listener positions, and adjusting the spectrum, amplitude, and especially phase of the waveforms in order to produce maximum constructive interference where high sound pressure levels are desired. The calculations also seek to reduce the sound pressure levels outside this region by creating destructive interference.

The digital waveform outputs of DSP's 260A–C are transported over links 265A–C to digital-to-analog converters 270A–C. Digital-to-analog converters 270A–C produce analog voltages 275A–C, which are applied to power amplifiers 280A–C. The output signals from the power amplifiers 290A–C are routed outside the locomotive, and are fanned out to each of the transducers in the array. An alternate embodiment of the invention condenses digital-to-analog converters 270A–C and power amplifiers 280A–C into a single digital (or class-D) power amplifier element.

Figure 3:
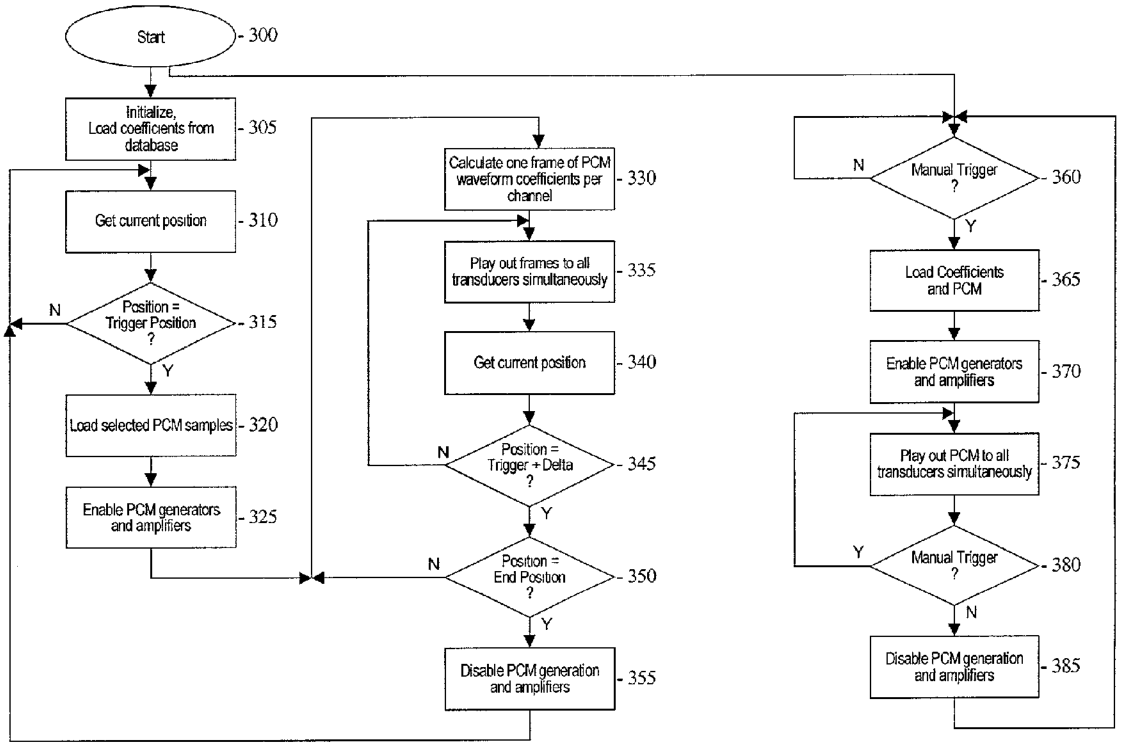
FIG. 3 is a flow chart of the algorithm used to control the sound field.

FIG. 3 represents a flowchart of the operation of the system of FIG. 2. Processing begins in oval 300, where two concurrent processes are started in parallel. A first process for automatic activation of the audible alert system is described in blocks 305–355 and a second process for manual activation in blocks 360–385.

Turning to processing for the first process, a database is read to transfer the various coefficients, tables, and values needed by the algorithm to the processor, in initialization box 305. Processing continues to action box 310, where the current position of the vehicle is determined. As shown in conjunction with FIG. 2, the position is advantageously determined by means of a GPS receiver, in the preferred embodiment.

In decision diamond 315, a determination is made whether audible signaling should commence by comparing the current position with trigger positions previously retrieved from the database. To reduce the computational load associated with this comparison, advantageously only trigger positions near the previous trigger need be compared. In addition, because of the inherent lack of precision in position location technologies, all position comparisons need to apply a tolerance window. If a trigger event is not detected, processing loops back to action box 310, where a fresh current position is acquired.

If, in decision diamond 315, a determination is made that audible signaling should commence, processing proceeds to action box 320 where the PCM waveform samples appropriate to the desired alert sound are loaded from a database. Different sound files can be loaded depending upon various parameters, including time of day and position. For example, when a train approaches a grade crossing, the traditional warning of four alerts is sounded, in the pattern long-long-short-long. Other locations, like approaching freight yards, tunnels, or stations call for different warnings, so advantageously, different sound files can be automatically loaded controlled by the current position. Processing continues to action box 325, where the DSP's, D/A converters, and power amplifiers shown in FIG. 2 are enabled.

Processing proceeds to action box 330, which represents the core of the calculation algorithm. A block of PCM samples from the sound file loaded in action box 320 is processed to produce the plurality of digital waveforms needed to drive the transducers, to produce the desired sound field shape. Many variables are used to perform this calculation. The raw sound waveform is modified in carefully controlled ways to insure the resulting PCM waveforms add and subtract correctly. The calculation must consider the distance to the intersection to calculate the range to the region of highest amplitude. This distance changes as the train advances, so each time action box 330 is executed, a new range is used, and the speed and distance sensors (from FIG. 2) are consulted to improve the accuracy of this range estimate. In addition, as the train closes on the intersection, a pointer is advanced through the sound file to select the appropriate PCM segment from the long sound file. Each of the plurality of waveforms goes to a transducer with a different physical position on the exterior of the locomotive, so coefficients representing this geometry are necessary to perform the calculation. The calculation also needs to take the speed of sound into account in order to accurately place the high intensity sound field, so the outside air temperature is also required by the calculation.

Once all the required data is in place, a calculation is made in action box 330 that determines the arrival time of the sound wave fronts from each of the transducers to each position in the area where high sound pressure levels are desired. An optimization technique, as known in the art, is applied to determine the delay, phase, and amplitude necessary from each transducer in order to most optimally produce a sound field of the desired shape. This optimization algorithm also seeks to simultaneously minimize the sound pressure levels outside the alert area, by creating regions of destructive interference.

Advantageously, the algorithm in action box 330 can dynamically move the region of highest sound pressure level in various ways. For example, the apparent source of the loudest sound can be made to sweep back and fourth, and side to side rapidly, increasing the ability of the alert to get the attention of drivers on the roadway. Moving the sound field dynamically in this way can also help to reduce the complexity of the optimization problem, because it need not produce a "T" shaped sound field with equal amplitudes throughout the region. It only must sweep a single high amplitude point rapidly over a "T" shaped region. Processing continues to action box 335, where the plurality of frames calculated in block 330 are played out through the transducer array.

In action box 340, the GPS, distance sensor or other location system acquires the current position. A determination is made in decision diamond 345 if the train or other vehicle has advanced sufficiently that it is necessary to recalculate the sound field to maintain high amplitude in the intersection. If not, the same sample frame is repeated in action box 335.

A determination is made in decision diamond 350 if the current position has passed the desired end of audible alerting. If not, processing continues by recalculating all PCM waveforms in action box 330. If so, processing moves to action box 355 where the PCM generation hardware and amplifiers are disabled, and control returns to action box 310, where the next alert trigger is detected.

A higher priority concurrent (second) process is always running to permit manual activation of the audible alerting system using the manual horn handle. In action box 360, processing waits for a manual activation. When activation is detected, processing moves to action box 365, where a special manual sound file is loaded and coefficients that produce the much less localized sound field needed in an emergency.

In action box 370, the PCM playback hardware and amplifiers are activated. Processing moves to action box 375, where the sound file is played out through all transducers. The same sound file could be played to all channels, or a calculation similar to that performed in action 330 could achieve various special alert spatial patterns.

A determination is made in decision diamond 380 whether the end of a manual activation is detected. If no end is detected, the PCM continues to play in action box 375. If the end of a manual trigger is detected, control passes to action box 385, where the PCM hardware and amplifiers are switched off, and control then returns to action box 360, where the next manual trigger is detected.

It is to be understood that the above-described embodiments are merely illustrative principles of the invention and that many variations may be devised by those skilled in the art without departing from the scope of this invention. It is, therefore, intended that such variations be included within the scope of the following clams.

I claim:

1. A train whistle adapted for operation on a moving locomotive to produce a sound field directed toward a predetermined geographic zone, the train whistle comprising:

a plurality of high power amplifiers;

a plurality of loudspeakers connected to said plurality of amplifiers and arranged in a predetermined array on said locomotive; and a digital signal processor configured to supply a plurality of signals for driving the plurality of amplifiers and loudspeakers and to control frequencies, amplitudes, and phases of the signals such that the loudspeakers produce a sound field directed toward a pre-determined geographic zone, and whereby the sound field dynamically changes as the locomotive advances toward the geographic zone.

2. A train whistle in accordance with claim 1 wherein the predetermined geographic zone comprises a roadway near a grade crossing.

* * * * *